United States Patent
Sauerer et al.

(10) Patent No.: US 7,449,512 B2
(45) Date of Patent: Nov. 11, 2008

(54) POLYOXYMETHYLENE MOLDING COMPOUNDS

(75) Inventors: Wolfgang Sauerer, Birkenheide (DE); Johannes Heinemann, Mannheim (DE)

(73) Assignee: BASF SE, Ludwigshafen (DE)

( * ) Notice: Subject to any disclaimer, the term of this patent is extended or adjusted under 35 U.S.C. 154(b) by 277 days.

(21) Appl. No.: 10/554,691

(22) PCT Filed: Apr. 24, 2004

(86) PCT No.: PCT/EP2004/004353

§ 371 (c)(1), (2), (4) Date: Oct. 2, 2006

(87) PCT Pub. No.: WO2004/096910

PCT Pub. Date: Nov. 11, 2004

(65) Prior Publication Data

US 2007/0060685 A1  Mar. 15, 2007

(30) Foreign Application Priority Data

Apr. 30, 2003 (DE) ................. 103 19 740

(51) Int. Cl.
*C08L 91/06* (2006.01)

(52) U.S. Cl. .............. 524/487; 524/210; 524/223; 524/230; 524/315; 524/318

(58) Field of Classification Search ............ 524/210, 524/223, 230, 315, 318, 487
See application file for complete search history.

(56) References Cited

U.S. PATENT DOCUMENTS

| 5,416,152 A | 5/1995 | Fleischer et al. |
| 5,763,084 A | 6/1998 | Michels et al. |
| 6,046,141 A | 4/2000 | Kurz et al. |
| 7,268,190 B2 * | 9/2007 | Ohme et al. ............. 525/400 |
| 2003/0171470 A1 | 9/2003 | Kurz et al. |

FOREIGN PATENT DOCUMENTS

| CA | A 2 331 052 | 7/2001 |
| DE | A 422 90 88 | 3/1992 |
| DE | A 100 29 533 | 12/2001 |
| EP | 292 746 | 11/1988 |
| EP | A 548 692 | 12/1992 |
| EP | A 905 190 | 9/1998 |

* cited by examiner

*Primary Examiner*—Peter Szekely
(74) *Attorney, Agent, or Firm*—Connolly Bove Lodge & Hutz LLP

(57) ABSTRACT

Thermoplastic molding compositions, comprising
A) from 15 to 99.94% by weight of a polyoxymethylene homo- or copolymer
B) from 0.05 to 10% by weight of a nonpolar polypropylene wax,
C) from 0.01 to 5% by weight of at least one ester or amide of saturated or unsaturated aliphatic carboxylic acids having from 10 to 40 carbon atoms with saturated aliphatic alcohols or amines having from 2 to 40 carbon atoms,
D) from 0 to 80% by weight of other additives,
where the total of the percentages by weight of components A) to D) is always 100%.

20 Claims, No Drawings

POLYOXYMETHYLENE MOLDING COMPOUNDS

This application claims priority from PCT/EP2004/004353 filed Apr. 24, 2004, and German application 10319740.0 filed Apr. 30, 2003, the disclosures of each application are incorporated herein by reference.

The invention relates to thermoplastic molding compositions, comprising

A) from 15 to 99.94% by weight of a polyoxymethylene homo- or copolymer
B) from 0.05 to 10% by weight of a nonpolar polypropylene wax,
C) from 0.01 to 5% by weight of at least one ester or amide of saturated or unsaturated aliphatic carboxylic acids having from 10 to 40 carbon atoms with saturated aliphatic alcohols or amines having from 2 to 40 carbon atoms,
D) from 0 to 80% by weight of other additives, where the total of the percentages by weight of components A) to D) is always 100%.

The invention further relates to the use of these molding compositions for producing moldings of any type, and to the resultant moldings.

Polyoxymethylene homo- and/or copolymers have been known for a long time. The polymers feature a number of excellent properties, making them suitable for a very wide variety of technical applications.

A significant requirement is good processing performance, and this is often significantly affected by the lubricants used in the respective combination of additives. By way of example, EP-A 548 692, EP-A 905 190, U.S. Pat. No. 6,046,141, or CA-A 2 331 052 disclose the addition of (oxidized) polyethylene waxes. By way of example, DE-A 422 90 88 and DE-A 100 29 533 disclose (fatty) acids or their salts or their esters as lubricants. Disadvantages of the lubricants known from the prior art are mold deposit and in particular impairment of mechanical properties (particularly toughness).

DE-A 33 44 313 discloses amine-substituted triazine compounds in combination with reactive polyfunctional cyanic esters for improving mechanical properties.

It is an object of the present invention, therefore, to provide polyoxymethylene molding compositions which have minimum cycle time with good demolding performance, and very little mold deposit, while retaining or improving mechanical properties, in particular toughness. Residual formaldehyde content should also be reduced.

We have found that this object is achieved by the molding compositions defined at the outset. Preferred embodiments are given in the subclaims.

Surprisingly, the use of a relatively brittle PP wax (in comparison with PE waxes) leads to better processing properties and to reduced residual formaldehyde content.

As component A), the molding compositions of the invention comprise from 15 to 99.94% by weight, preferably from 30 to 98% by weight, and in particular from 40 to 90% by weight, of a Polyoxymethylene homo- or copolymer.

These polymers are known per se to the person skilled in the art, and are described in the literature.

Very generally, these polymers comprise at least 50 mol % of —$CH_2O$— repeat units in the main polymer chain.

The homopolymers are generally prepared by polymerizing formaldehyde or trioxane, preferably in the presence of suitable catalysts.

For the purposes of the invention, component A) is preferably a Polyoxymethylene copolymer, especially one which, besides the recurring —$CH_2O$— units, also has up to 50 mol %, preferably from 0.1 to 20 mol %, in particular from 0.3 to 10 mol %, and very particularly preferably from 2 to 6 mol %, of repeat units

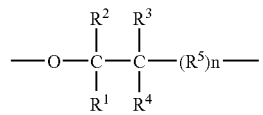

where $R^1$ to $R^4$, independently of one another, are hydrogen, $C_1$-$C_4$-alkyl or halogen-substituted alkyl having from 1 to 4 carbon atoms, and $R^5$ is —$CH_2$—, —$CH_2O$—, $C_1$-$C_4$-alkyl- or $C_1$-$C_4$-haloalkyl-substituted methylene or a corresponding oxymethylene group, and n is from 0 to 3. These groups may be advantageously introduced into the copolymers by ring-opening of cyclic ethers. Preferred cyclic ethers have the formula

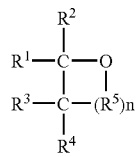

where $R^1$ to $R^5$ and n are as defined above. Mention may be made, merely as examples, of ethylene oxide, propylene 1,2-oxide, butylene 1,2-oxide, butylene 1,3-oxide, 1,3-dioxane, 1,3-dioxolane and 1,3-dioxepane as cyclic ethers, and also linear oligo- and polyformals, such as polydioxolane or polydioxepane as comonomers.

Other suitable components A) are oxymethylene terpolymers obtained, by way of example, by reacting trioxane, one of the cyclic ethers described above, and a third monomer, preferably bifunctional compounds of the formula

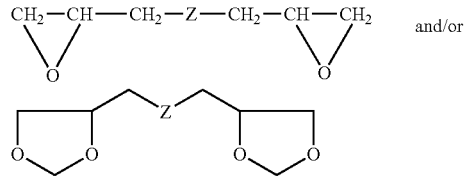

where Z is a chemical bond, —O—, —ORO— (R=$C_1$-$C_8$-alkylene or $C_3$-$C_8$-cycloalkylene).

Preferred monomers of this type are ethylene diglycide, diglycidyl ether, and diethers composed of glycidyl compounds and formaldehyde, dioxane, or trioxane in a molar ratio of 2:1, and also diethers composed of 2 mol of glycidyl compound and 1 mol of an aliphatic diol having from 2 to 8 carbon atoms, for example the diglycidyl ethers of ethylene glycol, 1,4-butanediol, 1,3-butanediol, cyclobutane-1,3-diol, 1,2-propanediol, or cyclohexane-1,4-diol, to mention merely a few examples.

Processes for preparing the homo- and copolymers described above are known to the person skilled in the art and described in the literature, and there is therefore no need to give further details here.

The preferred polyoxymethylene copolymers have melting points of at least 150° C. and molecular weights (weight-average) $M_w$ in the range from 5000 to 300 000, preferably from 7000 to 250 000.

Particular preference is given to end-group-stabilized polyoxymethylenes which have carbon-carbon bonds at the ends of the chains.

As component B), the molding compositions of the invention comprise amounts of from 0.05 to 10% by weight, preferably from 0.1 to 5% by weight, of a nonpolar polypropylene wax. Polypropylene waxes are generally polypropylenes with waxy character and a correspondingly low molecular weight.

The inventive waxes B) have an average molecular weight (weight-average) $M_w$ of from 2000 to 60 000 (determined by GPC using polystyrene standard), preferably from 5000 to 50 000, and in particular from 10 000 to 45 000.

The softening point of the inventive waxes B) is preferably at least 140° C., with preference at least 150° C., determined to DIN EN 1427 (ring and ball method).

The viscosity of the inventive waxes B) is generally from 10 to 5000 mPas, preferably from 100 to 3000 mPas to DIN 53018 at 170° C.

The density of the inventive waxes B) is usually from 0.87 to 0.92 g/cm³, preferably from 0.88 to 0.91 g/cm³ to DIN 53479.

Preferred PP waxes B) have the form of what are known as micropowders, the $d_{50}$ of which is from 1 to 50 µm, preferably from 5 to 30 µm.

For the purposes of the invention, nonpolar PP waxes are as defined in Ullmann's Encyclopedia of Industrial Chemistry, 6th edition, keyword 6.1.5 Polar polyolefin waxes, Verlag Chemie, 2000, i.e. waxes with no incorporation of polar groups (in particular of carboxy and/or ester groups).

The inventive PP waxes B) may be prepared in the stirred high-pressure autoclaves or in high-pressure tubular reactors, using regulators. They are preferably prepared in stirred high-pressure autoclaves. The stirred high-pressure autoclaves used for the process of the invention are known per se, and a description is found in Ullmann's Encyclopedia of Industrial Chemistry, 5th edition, keywords: Waxes, vol. A 28, pp. 146 et seq., Verlag Chemie Weinheim, Basle, Cambridge, New York, Tokyo, 1996. Their length/diameter ratio is mainly in the range from 5:1 to 30:1, preferably from 10:1 to 20:1. The high-pressure tubular reactors which may also be used are likewise found in Ullmann's Encyclopedia of Industrial Chemistry, 5th edition, keywords: Waxes, vol. A 28, pp. 146 et seq., Verlag Chemie Weinheim, Basle, Cambridge, New York, Tokyo, 1996.

Another conventional preparation method given by Ullmann (see above) is the depolymerization of polypropylene with higher molar masses.

The PP waxes B) obtainable commercially are translucent, colorless to white pulverulent products which give clear melts and are soluble in nonpolar solvents.

Preferred products are Licowax® PP, in particular Licowax PP 230 and PP 220 and Licowax VP PP grades (from Clariant GmbH), and Ceridust® VP 6071, and also LC 525 N, LC 502 N, LC 502 NC, LC 503 N, LC 503 NC grades from Hana Corporation, Korea.

As component C), the inventive molding compositions comprise from 0.01 to 5% by weight, preferably from 0.09 to 2% by weight, and in particular from 0.1 to 0.7% by weight, of at least one ester or amide of saturated or unsaturated aliphatic carboxylic acids having from 10 to 40 carbon atoms, preferably from 16 to 22 carbon atoms, or saturated aliphatic alcohols or amines having from 2 to 40 carbon atoms, preferably from 2 to 6 carbon atoms.

The carboxylic acids may be mono- or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols may be mono- to tetrahydric. Examples of alcohols are n-butanol, n-octanol, stearyl alcohol, ethylene glycol, propylene glycol, neopentyl glycol, glycerol, and pentaerythritol, preference being given to glycerol and pentaerythritol.

The aliphatic amines may be mono- to triamines. Examples of these are stearylamine, ethylenediamine, propylenediamine, hexamethylenediamine, di(6-aminohexyl)amine, particular preference being given to ethylenediamine and hexamethylenediamine. Preferred esters or amides are correspondingly glycerol distearat, glycerol tristearate, ethylenediamine distearate, glycerol monopalmitate, glycerol trilaurate, glycerol monobehenate, and pentaerythritol tetrastearate.

It is also possible to use mixtures of various esters or amides, or esters with amides combined, the mixing ratio here being as desired.

As component D), the molding compositions of the invention may comprise from 0 to 80% by weight, preferably from 0 to 50% by weight, and in particular from 0 to 40% by weight, of other additives.

Suitable sterically hindered phenols D1) are in principle any of the compounds having a phenolic structure and having at least one bulky group on the phenolic ring.

Examples of compounds whose use is preferred are those of the formula

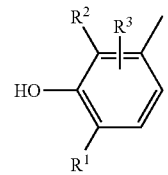

where:
$R^1$ and $R^2$ are alkyl, substituted alkyl or a substituted triazole group, where $R^1$ and $R^2$ may be identical or different, and $R^3$ is alkyl, substituted alkyl, alkoxy or substituted amino.

Antioxidants of the type mentioned are described, for example, in DE-A 27 02 661 (U.S. Pat. No. 4,360,617).

Another group of preferred sterically hindered phenols derives from substituted benzenecarboxylic acids, in particular from substituted benzenepropionic acids.

Particularly preferred compounds of this class have the formula

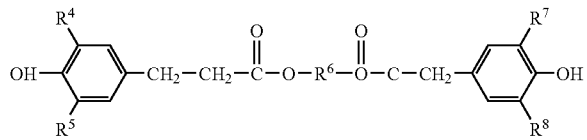

where $R^4$, $R^5$, $R^7$ and $R^8$ independently of one another, are $C_1$-$C_8$-alkyl which may in turn have substitution (at least one of these is a bulky group) and $R^6$ is a bivalent aliphatic radical which has from 1 to 10 carbon atoms and may also have C—O bonds in its main chain.

Preferred compounds of this formula are

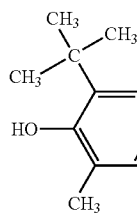 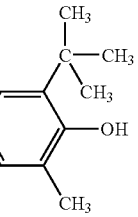

(Irganox® 245 from Ciba-Geigy)

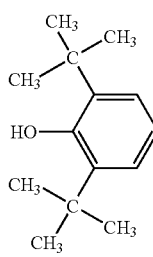 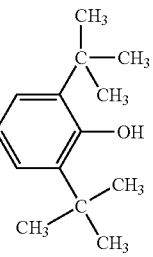

(Irganox® 259 from Ciba-Geigy)

Mention should be made of all of the following as examples of sterically hindered phenols:

2,2'-methylenebis(4-methyl-6-tert-butylphenol), 1,6-hexanediol bis[3-(3,5-di-tert-butyl-4-hydroxyphenyl)propionate], pentaerythritol tetrakis[3-(3,5-di-tert-butyl-4-hydroxy-phenyl)propionate], distearyl 3,5-di-tert-butyl-4-hydroxybenzylphosphonate, 2,6,7-trioxa-1-phosphabicyclo[2.2.2]oct-4-ylmethyl 3,5-di-tert-butyl-4-hydroxy-hydrocinnamate, 3,5-di-tert-butyl-4-hydroxyphenyl-3,5-distearylthiotriazylamine, 2-(2'-hydroxy-3'-hydroxy-3',5'-di-tert-butylphenyl)-5-chlorobenzotriazole, 2,6-di-tert-butyl-4-hydroxymethylphenol, 1,3,5-trimethyl-2,4,6-tris(3,5-di-tert-butyl-4-hydroxy-benzyl)benzene, 4,4'-methylenebis(2,6-di-tert-butylphenol), 3,5-di-tert-butyl-4-hydroxybenzyldimethylamine and N, N'-hexamethylenebis-3,5-di-tert-butyl-4-hydroxyhydrocinnamide.

Compounds which have proven especially effective and which are therefore preferably used are 2,2'-methylenebis(4-methyl-6-tert-butylphenol), 1,6-hexanediol bis(3,5-di-tert-butyl-4-hydroxyphenyl]propionate (Irganox® 259), pentaerythritol tetrakis[3-(3,5-di-tert-butyl-4-hydroxyphenyl) propionate] and the Irganox® 245 described above from Ciba Geigy, which is particularly suitable.

The amounts present of the antioxidants (D1), which may be used individually or as mixtures, are from 0.005 to 2% by weight, preferably from 0.1 to 1.0% by weight, based on the total weight of the molding compositions A) to D).

In some cases, sterically hindered phenols having not more than one sterically hindered group in the position ortho to the phenolic hydroxy group have proven particularly advantageous, in particular when assessing colorfastness on storage in diffuse light over prolonged periods.

The polyamides which may be used as component D2) are known per se. Semicrystalline or amorphous resins may be used, e.g. those described in the Encyclopedia of Polymer Science and Engineering, Vol. 11, pp. 315-489, John Wiley & Sons, Inc., 1988, and the melting point of the polyamide here should preferably be below 225° C., with preference below 215° C.

Examples of these are polyhexamethyleneazelamide, polyhexamethylenesebacamide, polyhexamethylenedodecanediamide, poly-11-aminoundecanamide and bis(p-aminocyclohexyl)methanedodecanediamide, and the products obtained by ring-opening of lactams, for example polylaurolactam. Other suitable polyamides are based on terephthalic or isophthalic acid as acid component and/or trimethylhexamethylene-diamine or bis(p-aminocyclohexyl)propane as diamine component and polyamide base resins prepared by copolymerizing two or more of the abovementioned polymers or components thereof.

Particularly suitable polyamides which may be mentioned are copolyamides based on caprolactam, hexamethylenediamine, p,p'-diaminodicyclohexylmethane and adipic acid. An example of these is the product marketed by BASF Aktiengesellschaft under the name Ultramid® 1 C.

Other suitable polyamides are marketed by Du Pont under the name Elvamide®.

The preparation of these polyamides is also described in the abovementioned text. The ratio of terminal amino groups to terminal acid groups can be controlled by varying the molar ratio of the starting compounds.

The proportion of the polyamide in the novel molding composition is from 0.001 to 2% by weight, by preference from 0.005 to 1.99% by weight, preferably from 0.01 to 0.08% by weight.

The dispersibility of the polyamides used can be improved in some cases by concomitant use of a polycondensation product made from 2,2-di(4-hydroxyphenyl)-propane (bisphenol A) and epichlordhydrin.

Condensation products of this type made from epichlorohydrin and bisphenol A are commercially available. Processes for their preparation are also known to the person skilled in the art. Tradenames of the polycondensates are Phenoxy® (Union Carbide Corporation) and Epikote® (Shell). The molecular weight of the polycondensates can vary within wide limits. In principle, any of the commercially available grades is suitable.

As component D3), the polyoxymethylene molding compositions of the invention may comprise from 0.002 to 2.0% by weight, preferably from 0.005 to 0.5% by weight, and in particular from 0.01 to 0.3% by weight, based on the total weight of the molding compositions, of one or more of the alkaline earth metal silicates and/or alkaline earth metal glycerophosphates. Calcium and in particular magnesium have proven to be preferable as alkaline earth metals for forming the silicates and glycerophosphates. Useful compounds are calcium glycerophosphate and preferably magnesium glycerophosphate and/or calcium silicate and preferably magnesium silicate. Particularly preferable alkaline earth metal silicates here are those described by the Formula $$Me.xSiO_2.nH_2O$$

where:
Me is an alkaline earth metal, preferably calcium or in particular magnesium,
x is a number from 1.4 to 10, preferably from 1.4 to 6, and
n is a number greater than or equal to 0, preferably from 0 to 8.

The compounds D) are advantageously used in finely ground form. Particularly suitable products have an average particle size of less than 100 μm, preferably less than 50 μm.

Preferably used are calcium silicates and magnesium silicates and/or calcium glycerophosphates and magnesium glycerophosphates may be defined more precisely for example by the following characteristic values:

Calcium silicate and magnesium silicate, respectively:
content of CaO and MgO, respectively: from 4 to 32% by weight, preferably from 8 to 30% by weight and in particular from 12 to 25% by weight,
ratio of $SiO_2$ to CaO and $SiO_2$ to MgO, respectively (mol/mol): from 1.4 to 10, preferably from 1.4 to 6 and in particular from 1.5 to 4,
bulk density: from 10 to 80 g/100 ml, preferably from 10 to 40 g/100 ml, and average particle size: less than 100 μm, preferably less than 50 μm.

Calcium glycerophosphates and magnesium glycerophosphates, respectively:
content of CaO and MgO, respectively: above 70% by weight, preferably above 80% by weight,
residue on ashing: from 45 to 65% by weight,
melting point: above 300° C., and
average particle size: less than 10 μm, preferably less than 50 μm.

As component D4), the inventive molding compositions may comprise from 0 to 3% by weight, preferably from 0.05 to 3% by weight, in particular from 0.09 to 2% by weight, and very particularly preferably from 0.1 to 1% by weight, of at least one compound of the formula

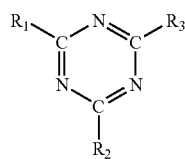

where $R_1$, $R_2$ and $R_3$ are identical or different and are, respectively, hydrogen atoms, halogen atoms, a hydroxy group, an alkyl group, an alkoxy group, an aryl group, an arylalkyloxy group, or a substituted or unsubstituted amine group, with the proviso that at least one of the radicals $R_1$, $R_2$ and $R_3$ is a substituted or unsubstituted amine group.

A preferred component D4) which may be mentioned is provided by compounds of the formula

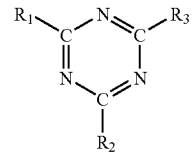

where $R_1$, $R_2$, and $R_3$ are identical or different and are, respectively, hydrogen atoms, halogen atoms, a hydroxy group, an alkyl group, an alkoxy group, an aryl group, an arylalkyloxy group, or a substituted or unsubstituted amine group, with the proviso that at least one of the radicals $R_1$, $R_2$ and $R_3$ is a substituted or unsubstituted amine group, and at least 1 radical $R_1$, $R_2$, or $R_3$ derives from an aromatic $C_5$-$C_{20}$ group, which may be unsubstituted or substituted.

The halogen atom is composed of chlorine or bromine, for example, preferably of chlorine.

Examples for the alkyl group are those having from 1 to 6 carbon atoms, preferably from 1 to 4 carbon atoms.

Examples of alkoxy groups are those having from 1 to 6 carbon atoms, preferably from 1 to 4 carbon atoms.

The phenyl groups, naphthyl groups, and fluorenyl groups are preferred as aryl group, and phenylalkyloxy groups, in particular benzyloxy or phenylethyloxy groups, are preferred as arylalkyloxy groups.

Examples of substituents on the substituted amino group encompass lower alkyl groups having from 1 to 6 carbon atoms, such as methyl, ethyl, butyl, or hexyl groups, phenyl groups, lower alkenyl groups having from 3 to 6 carbon atoms, such as allyl or hexenyl groups, hydroxyalkyl groups having 1 or 2 carbon atoms, such as hydroxymethyl or hydroxyethyl groups, and cyanoalkyl groups having from 3 to 6 carbon atoms, such as cyanoethyl or cyanobutyl groups.

Examples of amine-substituted and aromatic-substituted triazines encompass 2,4-diamino-6-(o,p,m)chlorophenyltriazine, 2-amino-4-chloro-6-phenyltriazine, 2-amino-4,6-diphenyltriazine, 2,4-diamino-6-naphthyltriazine, 2,4-diamino-6-fluorenyltriazine, 2,4-diamino-6-(o,m,p) alkylphenyltriazines, the methyl radical being preferred as substituent, 2,4-diamino-6-(o,m,p)methoxyphenyltriazine and 2,4-diamino-6-(o,m,p)carboxylphenyltriazines, N-phenylmelamine, N,N'-diphenylmelamine, particular preference being given to benzoguanamine, i.e. 2,4-diamino-6-phenyl-sym-triazine and 2,4-diamino-6-benzyloxy-sym-triazine.

Particularly preferred components D4) comprise at least 2 radicals $R_1$, $R_2$, or $R_3$ which derive from (un)substituted amino groups, and/or in which the aromatic radical $R_1$, $R_2$, or $R_3$ is composed of at least one phenyl ring.

Component D4) is very particularly preferably composed of benzoguanamine. Preparation processes are known to the person skilled in the art, and there is therefore no need for further details to be given here.

As further component D5), the inventive molding compositions may comprise from 0.0001 to 3% by weight, preferably from 0.001 to 1% by weight, and in particular from 0.01 to 0.3% by weight, of a nucleating agent.

Nucleating agents which may be used are any of the known compounds, such as melamine cyanurate, boron compounds, such as boron nitride, silica, pigments, e.g. Heliogen Blue® (copper phthalocyanine pigment; registered trademark of BASF Aktiengesellschaft).

Talc is a preferred nucleating agent, and is a hydrated magnesium silicate of the formula $Mg_3[(OH)_2/Si_4O_{10}]$ or $3MgO.4SiO_2.H_2O$. This is termed a three-layer phyllosilicate, and has a triclinic, monoclinic, or rhombic crystal structure and a lamellar appearance. Other trace elements which may be present are Mn, Ti, Cr, Ni, Na, and K, and some of the OH groups here may have been replaced by fluoride.

Particular preference is given to the use of talc in which 100% of the particle sizes are <20 μm. The particle size distribution is usually determined by sedimentation analysis, and is preferably:

| | |
|---|---|
| <20 μm | 100% by weight |
| <10 μm | 99% by weight |
| <5 μm | 85% by weight |
| <3 μm | 60% by weight |
| <2 μm | 43% by weight |

Products of this type are commercially available as Micro-Talc I.T. extra (Norwegian Talc Minerals).

As component D5), the inventive molding compositions may comprise from 0.01 to 3% by weight, preferably from 0.1 to 1.0% by weight, and in particular from 0.1 to 0.6% by weight, of at least one branched or crosslinked polyoxymethylene copolymer, as nucleating agent.

The inventive branched or crosslinked polyoxymethylenes may be obtained a) by copolymerizing monomers listed above under A), preferably trioxane with at least one polyfunctional compound copolymerizable with these, preferably with trioxane, and, where appropriate, with at least one monofunctional compound copolymerizable with trioxane, or b) by branching or crosslinking reactions carried out subsequently on a linear polyoxymethylene having pendant or main-chain functional groups, or c) by copolymerizing monomers listed above under A), preferably trioxane, with at least one monofunctional compound copolymerizable with these, preferably with trioxane, and with a branched or crosslinked polyether, or by reacting a linear polyoxymethylene with a branched or crosslinked polyether.

By way of example, polymers of this type can be found in DE-A 22 33 143, DE 21 01 817, DE-A 21 66 377 and DE-A 21 50 038.

Particularly suitable components D5) are oxymethylene terpolymers obtained, by way of example, by reacting trioxane, one of the cyclic ethers described above under A), and a third monomer, preferably bifunctional compounds of the formula

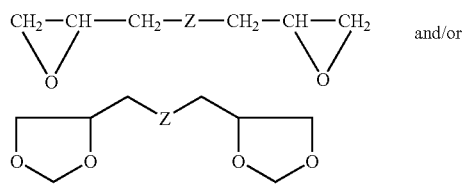

and/or where Z is a chemical bond, —O—, —ORO— (R=$C_1$-$C_8$-alkylene or $C_3$-$C_8$-cycloalkylene).

Preferred monomers of this type are ethylene diglycide, diglycidyl ether, and diethers composed of glycidyl compounds and formaldehyde, dioxane, or trioxane in a molar ratio of 2:1, and also diethers composed of 2 mol of glycidyl compound and 1 mol of an aliphatic diol having from 2 to 8 carbon atoms, for example the diglycidyl ethers of ethylene glycol, 1,4-butanediol, 1,3-butanediol, cyclobutane-1,3-diol, 1,2-propanediol, or cyclohexane-1,4-diol, to mention merely a few examples.

The branched or crosslinked polyoxymethylenes used according to the invention have MVR melt indices of from 0.1 to 80 $cm^3$/10 min., preferably from 0.5 to 50 $cm^3$/10 min., to ISO 1133 at a temperature of 190° C. and with a load of 2.16 kg. Branched or crosslinked polyoxymethylenes with melt indices of from 0.8 to 40 $cm^3$/10 min. are very particularly suitable.

Fillers which may be used in amounts of up to 50% by weight, preferably 5 to 40% by weight, comprise by way of example potassium titanate whiskers, carbon fibers, and preferably glass fibers. The glass fibers may, for example, be used in the form of glass wovens, mats, nonwovens and/or glass filament rovings or chopped glass filaments made from low-alkali E glass and having a diameter of from 5 to 200 μm, preferably from 8 to 50 μm. After they have been incorporated, the fibrous fillers preferably have an average length of from 0.05 to 1 mm, in particular from 0.1 to 0.5 mm.

Examples of other suitable fillers are calcium carbonate and glass beads, preferably in ground form, or mixtures of these fillers.

Other additives which may be mentioned are amounts of up to 50% by weight, preferably from 0 to 40% by weight, of impact-modifying polymers (also referred to below as elastomeric polymers or elastomers).

Preferred types of such elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, nonconjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenyinorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0$^{2,6}$]-3,8-decadiene, or mixtures of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPDM rubbers may also have been grafted with other monomers, e.g. with glycidyl (meth)acrylates, with (meth) acrylic esters, or with (meth)acrylamides.

Copolymers of ethylene with esters of (meth)acrylic acid are another group of preferred rubbers. The rubbers may also contain monomers having epoxy groups. These monomers containing epoxy groups are preferably incorporated into the rubber by adding, to the monomer mixture, monomers having epoxy groups and the formula I or II

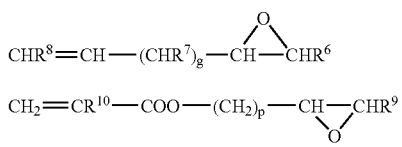  (I)

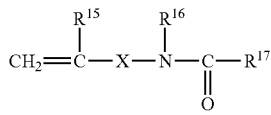  (II)

where $R_6$ to $R_{10}$ are hydrogen or alkyl having from 1 to 6 carbon atoms, and m is an integer from 0 to 20, g is an integer from 0 to 10 and p is an integer from 0 to 5.

$R_6$ to $R_8$ are preferably hydrogen, where m is 0 or 1 and g is 1. The corresponding compounds are allyl glycidyl ether and vinyl glycidyl ether.

Preferred compounds of the formula II are acrylic and/or methacrylic esters having epoxy groups, for example glycidyl acrylate and glycidyl methacrylate.

The copolymers are advantageously composed of from 50 to 98% by weight of ethylene, from 0 to 20% by weight of monomers having epoxy groups, the remainder being (meth) acrylic esters.

Particular preference is given to copolymers made from
from 50 to 98% by weight, in particular from 55 to 95% by weight, of ethylene,
from 0.1 to 40% by weight, in particular from 0.3 to 20% by weight, of glycidyl acrylate and/or glycidyl methacrylate, (meth)acrylic acid and/or maleic anhydride, and
from 1 to 50% by weight, in particular from 10 to 40% by weight, of n-butyl acrylate and/or 2-ethylhexyl acrylate.

Other preferred (meth)acrylates are the methyl, ethyl, propyl, isobutyl and tert-butyl esters.

Besides these, comonomers which may be used are vinyl esters and vinyl ethers.

The ethylene copolymers described above may be prepared by processes known per se, preferably by random copolymerization at high pressure and elevated temperature. Appropriate processes are well known.

Preferred elastomers also include emulsion polymers whose preparation is described, for example, by Blackley in the monograph "Emulsion Polymerization". The emulsifiers and catalysts which may be used are known per se.

In principle it is possible to use homogeneously structured elastomers or those with a shell construction. The shell-type structure is determined by the sequence of addition of the individual monomers. The morphology of the polymers is also affected by this sequence of addition.

Monomers which may be mentioned here, merely as examples, for the preparation of the rubber fraction of the elastomers are acrylates, such as n-butyl acrylate and 2-ethylhexyl acrylate, and corresponding methacrylates, and butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). When elastomers have more than one shell it is also possible for more than one shell to be composed of a rubber phase.

If one or more hard components (with glass transition temperatures above 20° C.) are involved, besides the rubber phase, in the structure of the elastomer, these are generally prepared by polymerizing, as principal monomers, styrene, acrylonitrile, methacrylonitrile, a-methylstyrene, p-methylstyrene, or acrylates or methacrylates, such as methyl acrylate, ethyl acrylate or methyl methacrylate. Besides these, it is also possible to use relatively small proportions of other comonomers.

It has proven advantageous in some cases to use emulsion polymers which have reactive groups at their surfaces. Examples of groups of this type are epoxy, amino and amide groups, and also functional groups which may be introduced by concomitant use of monomers of the formula

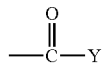

where:
$R^{15}$ is hydrogen or $C_1$-$C_4$-alkyl,
$R^{16}$ is hydrogen, $C_1$-$C_8$-alkyl or aryl, in particular phenyl,
$R^{17}$ is hydrogen, $C_1$-$C_{10}$-alkyl, $C_6$-$C_{12}$-aryl or —$OR^{18}$,
$R^{18}$ is $C_1$-$C_8$-alkyl or $C_6$-$C_{12}$-aryl, if desired with substitution by O— or N-containing groups,
X is a chemical bond, $C_1$-$C_{10}$-alkylene or $C_6$-$C_{12}$-arylene, or $$-\underset{\underset{O}{\|}}{C}-Y$$

Y is OZ or NH-Z and
Z is $C_1$-$C_{10}$-alkylene or $C_6$-$C_{12}$-arylene.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate, butanediol diacrylate, and dihydrodicyclopentadienyl acrylate, and also the compounds described in EP-A 50 265.

It is also possible to use the monomers known as graft-linking monomers, i.e. monomers having two or more polymerizable double bonds which react at different rates during the polymerization. Preference is given to the use of those compounds in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers containing allyl groups, in particular allyl esters of ethylenically unsaturated carboxylic acids, such as allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in component D) is generally up to 5% by weight, preferably not more than 3% by weight, based on D).

Some preferred emulsion polymers are listed below. Mention is made here firstly of graft polymers with a core and with at least one outer shell and the following structure:

| Monomers for the core | Monomers for the shell |
|---|---|
| 1,3-butadiene, isoprene, n-butyl acrylate, ethylhexyl acrylate or a mixture of these, where appropriate together with crosslinking monomers | Styrene, acrylonitrile, (meth)acrylate, where appropriate having reactive groups, as described herein |

Instead of graft polymers whose structure has more than one shell it is also possible to use homogeneous, i.e. single-shell, elastomers made from 1,3-butadiene, isoprene and n-butyl acrylate or from copolymers of these. These products, too, may be prepared by concomitant use of crosslinking monomers or of monomers having reactive groups.

The elastomers D) described may also be prepared by other conventional processes, e.g. by suspension polymerization.

Other suitable elastomers which may be mentioned are thermoplastic polyurethanes, as described in EP-A 115 846, EP-A 115 847, and EP-A 117 664, for example.

It is, of course, also possible to use mixtures of the rubber types listed above.

The molding compositions of the invention may also comprise other conventional additives and processing aids. Merely by way of example, mention may be made here of additives for scavenging formaldehyde (formaldehyde scavengers), melamine-formaldehyde condensates (MFCs), plasticizers, coupling agents, and pigments. The proportion of these additives is generally in the range from 0.001 to 5% by weight.

The thermoplastic molding compositions of the invention are prepared by mixing the components in a manner known per se, and no detailed information is therefore required here. The components are advantageously mixed in an extruder.

In one preferred method of production, component B) and, where appropriate, component(s) C) may be applied at room temperature to pellets A) and then extruded.

The molding compositions may be used to produce moldings (or semifinished products, unsupported films, supported films, or foams) of any type. The molding compositions feature very low residual formaldehyde content together with good mechanical properties and processing, and also feature thermal stability. Moldings composed of these molding compositions are therefore particularly suitable for applications as pushbuttons, recessed grips, sunroof frames, loudspeaker grilles, sanitary fittings, video cassettes, toy components, windows, door furniture, clips, fasteners, snap connecters, door sockets, tank insert components, gearwheels, guiding elements, conveyor belts, conveyor systems, spray valves, brewing units for espresso machines, coffee machines, articulated joints, rollers, bearings, slide rails, pump components, and filter housings, drive systems, springing elements and locking elements, bobbins, diverter rollers, gearbox components, pendulum supports.

EXAMPLES

The following components were used:

Component A/1

Polyoxymethylene copolymer composed of 97.3% by weight of trioxane and 2.7% by weight of butanediol formal. The product also comprised about 3% by weight of unconverted trioxane and 5% by weight of thermally unstable fractions. After degradation of the thermally unstable fractions, the copolymer had a melt volume rate of from 7 to 8 cm$^3$/10 min. (190° C. 2.16 kg, to ISO 1133).

Component A/2

POM copolymer with MVR of from 25 to 29 cm$^3$/10 min. (190° C., 2.16 kg to ISO 1133).

Component B/1)

Licowax® PP 230 P (PP wax from Clariant GmbH, softening point from 160 to 166° C. to DIN EN 1427, viscosity at 170° C. about 1700 mPas to DIN 53018; $M_n$ from about 10 000 to 12 000 g/mol, $M_w$ from about 30 000 to 45 000 g/mol) by GPC (polystyrene standard).

Component B/2) (for comparison)

Licowax® PED 191 (oxidized PE wax from Clariant; drop point from 120 to 125° C. to DIN 51801/2, viscosity at 140° C. about 1800 mPas to DIN 53018).

Component C)

Loxiol® P 1206 from Cognis (glycerol distearate)

Component D1)

Irganox® 245 from Ciba:

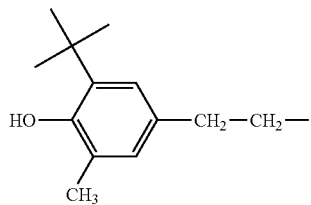 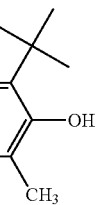

Component D2)

Polyamide oligomer with a molar mass of about 3000 g/mol, prepared from caprolactam, hexamethylenediamine, adipic acid and propionic acid (as molecular weight regulator) by a method based on Examples 5-4 of U.S. Pat. No. 3,960,984 ("dicapped PA").

Component D3)

Synthetic magnesium silicate (Ambosol® from PQ France) with the following properties:

| | |
|---|---|
| Content of MgO | ≧14.8% by weight |
| Content of SiO$_2$ | ≧59% by weight |
| SiO$_2$:MgO ratio | 2.7 mol/mol |
| Bulk density | 20-30 g/100 m |
| Loss on ashing | <25% by weight |

Component D4)

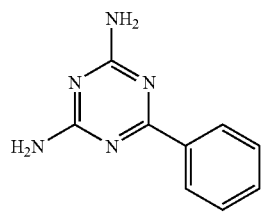

Benzoguanamine

Component D5)

| Talc (Mikro-Talc I.T. Extra) | |
|---|---|
| Particle size <20 μm | 100% |
| Particle size <10 μm | 99% |
| Particle size <5 μm | 85% |
| Particle size <3 μm | 60% |
| Particle size <2 μm | 43% |

Determined by sedimentation analysis.

Component D6)

Melamine-formaldehyde condensate (MFC) in accordance with Example 1 of DE-A 25 40 207.

To prepare the molding compositions, component A) was mixed with the amounts given in the table of components B) to D) in a dry-mixer at a temperature of 23° C. The resultant mixture was introduced into a vented twin-screw extruder (ZSK 30 or ZSK 53 from Werner & Pfleiderer), homogenized at 230° C., and devolatilized, and the homogenized mixture was extruded through a die in the form of a strand and pelletized, or pelletized under water in bead/lenticular form via a die.

The following were determined to test thermal stability:

WL N$_2$: Loss in weight in percent of a specimen composed of 1.2 g of pellets on heating for 2 hours to 222° C. in nitrogen.

WL air: Loss in weight in percent of a specimen composed of 1.2 g of pellets on heating for 2 hours to 222° C. in air.

Residual formaldehyde content was determined in each case prior to and after the following post-devolatilization:

5 kg of POM were treated for 5 hours at 145° C. in a tower dryer with a countercurrent air flow of 0.6 m/s, the volume flow being 12 l/h, with 50 g of water vapor/kg of air.

Formaldehyde emission was determined on standard test specimens to VDA 275.

Formaldehyde content in the pellets was determined as follows:

70 ml of deionized water formed an initial charge in a 250 ml Erlenmeyer flask with ground glass joint, and 50 g of the specimen to be studied were added to this initial charge. The Erlenmeyer was then provided with a clean reflux condenser, and the mixture was heated rapidly, with stirring, to boiling on a preheated magnetic stirrer system. 50 minutes later, the mixture was cooled rapidly and the formaldehyde content was determined on a Metrohm Titroprozessor 682, using User Methods 1 and 2.

The mixture was adjusted to pH 9.4 using N/10 sodium hydroxide solution (5 ml) and N/10 sulfuric acid, and 5 ml of sodium sulfite solution were added, and after a short reaction time the pH of the mixture was back-titrated to 9.4, using N/10 sulfuric acid.

The residual formaldehyde content was calculated by:

weight of $FA$[mg]=consumption (H$_2$SO$_4$)×2×concentration (H$_2$SO$_4$)×weight of formaldehyde;

$FA$ content [%]=weight of $FA$[mg]/specimen weight [g, POM pellets]×(1000000/1000) (sodium sulfite solution=136 g of Na$_2$SO$_3$+1.000 g of deionized water)

$FA$=formaldehyde

Cycle Time Characterization

To determine the minimum cycle time required ("minimum cycle time") to produce satisfactory moldings by injection molding, moldings were produced on an Arburg Allrounder 270 S injection molding system with a locking force of 500 kN and a screw diameter of 18 mm. The molding is a cylindrical beaker closed by a base on one side and having a height of 14 mm, an external diameter of 13.6 mm, and a wall thickness of 1 mm. Injection molding conditions:

melt temperature 200° C.

mold surface temperature 90° C.

screw advance rate 60 mm/s melt cushion 5 mm injection time 0.4 s hold pressure time 3 s injection pressure 700 bar hold pressure 400 bar back pressure 50 bar.

To determine the minimum cycle time, the cooling time was shortened in steps of 0.5 s, beginning at 25 s. At very short cycle times, after the molding had been demolded its base had a convex curvature, the result being that the molding tilted toward the side when placed base-downward on a horizontal bench, its longitudinal axis therefore deviating from the perpendicular to the bench surface. The minimum cycle time is the shortest cycle time at which the moldings could be placed on the bench surface without visually detectable tilting, i.e. the moldings rested stably, their longitudinal axis being perpendicular to the bench surface once they had been placed in position.

To assess toughness, use was made of the nominal tensile strain at break from the ISO 527 tensile test at +23° C. and the Charpy notched impact strength to ISO 179/1eA(f) at +23° C., and also the Charpy impact strength (without notch) to ISO 179/1eU.

The constitutions of the molding composition and the results of the measurements are found in the tables.

Data for B)-D) has been given, the amount of A/1 or A/2 being in each case the difference from 100% by weight.

TABLE 1

Examples using component A/1

| Components | 1c | 2 | 3 | 4 | 5 | 6 | 7 | 8 | 9c | 10c | 11 | 12 | 13c |
|---|---|---|---|---|---|---|---|---|---|---|---|---|---|
| B/1 [% by weight] | — | 0.4 | 0.4 | 0.4 | 0.4 | 0.4 | 0.4 | 0.3 | — | — | 0.4 | 1 | — |
| B/2 | — | — | — | — | — | — | — | — | — | 0.3 | — | — | — |
| C | — | 0.55 | 0.55 | 0.55 | 0.55 | 0.55 | 0.55 | 0.15 | 0.15 | 0.15 | 0.55 | 0.55 | 0.55 |
| D1 | 0.35 | 0.35 | 0.35 | 0.35 | 0.35 | 0.35 | 0.35 | 0.35 | 0.35 | 0.35 | 0.35 | 0.35 | 0.35 |
| D2 | 0.04 | — | 0.04 | 0.04 | — | 0.04 | 0.04 | 0.04 | 0.04 | 0.04 | 0.04 | 0.04 | 0.04 |
| D3 | 0.05 | 0.05 | 0.05 | 0.05 | 0.05 | 0.05 | 0.05 | 0.05 | 0.05 | 0.05 | 0.05 | 0.05 | 0.05 |
| D4 | — | 0.4 | 0.4 | 0.2 | 0.4 | 0.4 | 0.2 | — | — | — | — | — | — |
| D5 | — | — | — | — | 0.1 | 0.1 | 0.1 | — | — | — | — | — | — |
| D6 | 0.2 | — | — | — | — | — | — | 0.2 | 0.2 | 0.2 | 0.2 | 0.2 | 0.2 |
| WL thermal test $N_2$ [%] | 0.26 | 0.18 | 0.15 | 0.17 | 0.19 | 0.15 | 0.17 | | | | | | |
| WL thermal test air [%] | 1.13 | — | 1.2 | 0.89 | — | — | — | | | | | | |
| After post-devolatilization | | | | | | | | | | | | | |
| FA (sulfite method) [ppm] | 40 | 16 | 15 | 17 | 15 | 15 | 15 | | | | | | |
| FA (VDA 275) [ppm] | 8 | 2 | 2 | 2 | 3 | 3 | 3 | | | | | | |
| Min. cycle time [s] | | | | | | | | 24.5 | 31 | 26 | 26 | 26 | 27.5 |
| Tensile strain at break [%] | | | | | | | | 27 | 25 | 22 | 30 | 31 | 29 |
| Charpy notched impact strength [kJ/m²] | | | | | | | | 6.1 | 5.4 | 5.7 | 5.5 | 5.7 | 5.3 |

TABLE 2

Examples using component A/1

| Components | 1 | 2 | 3 | 4 | 5 |
|---|---|---|---|---|---|
| B/1 [% by weight] | 0.4 | 0.4 | 0.4 | 0.4 | 0.4 |
| B/2 | — | — | — | — | — |
| C | 0.55 | 0.55 | 0.55 | 0.55 | 0.55 |
| D1 | 0.35 | 0.35 | 0.35 | 0.35 | 0.35 |
| D2 | 0.04 | 0.04 | 0.04 | 0.04 | 0.04 |
| D3 | 0.05 | 0.05 | 0.05 | 0.05 | 0.05 |
| D4 | 0.4 | 0.4 | 0.4 | 0.4 | 0.4 |
| D5 | 0.075 | 0.1 | 0.125 | 0.15 | 0.2 |
| D6 | — | — | — | — | — |
| WL thermal test $N_2$ [%] | 0.22 | — | 0.19 | 0.20 | 0.18 |
| WL thermal test air [%] | — | — | — | — | — |
| After post-devolatilization | | | | | |
| FA (sulfite method) [ppm] | 14 | 14 | 14 | 13 | 15 |
| FA (VDA 275) [ppm] | 2 | 2 | 2 | 4 | 2 |
| Min. cycle time [s] | — | 26 | — | — | 25.5 |
| Tensile strain at break [%] | — | — | — | — | — |
| Charpy notched impact strength [kJ/m²] | — | — | — | — | — |
| Charpy impact strength [kJ/m²] | — | 254 | — | 273 | 260 |

TABLE 3

Examples using component A/2

| Components | 1 | 2 | 3 | 4 | 5 | 1c |
|---|---|---|---|---|---|---|
| B/1 [% by weight] | 0.4 | 0.4 | 0.4 | 0.4 | 0.4 | — |
| B/2 | — | — | — | — | — | — |
| C | 0.6 | 0.6 | 0.6 | 0.6 | 0.6 | 0.3 |
| D1 | 0.2 | 0.2 | 0.2 | 0.2 | 0.2 | 0.2 |
| D2 | 0.04 | 0.04 | 0.04 | 0.04 | 0.04 | 0.04 |
| D3 | 0.05 | 0.05 | 0.05 | 0.05 | 0.05 | 0.05 |
| D4 | 0.4 | 0.4 | 0.4 | 0.4 | 0.4 | — |
| D5 | 0.075 | 0.1 | 0.125 | 0.15 | 0.2 | — |
| D6 | — | — | — | — | — | 0.2 |
| WL thermal test $N_2$ [%] | — | — | 0.18 | 0.13 | 0.23 | 0.21 |
| WL thermal test air [%] | — | — | — | — | 1.12 | 1.18 |
| After post-devolatilization | | | | | | |
| FA (sulfite method) [ppm] | 19 | 17 | — | — | 19 | 30 |
| FA (VDA 275) [ppm] | 2 | 1 | 1 | 2 | 2 | 5 |
| Min. cycle time [s] | — | 26.5 | — | — | 26.0 | 29.5 |
| Tensile strain at break [%] | — | — | — | — | — | — |
| Charpy notched impact strength [kJ/m²] | — | — | — | — | — | — |

We claim:

1. A thermoplastic molding composition comprising:
   A) from 15 to 99.94% by weight of a polyoxymethylene homo- or copolymer;
   B) from 0.05 to 10% by weight of a nonpolar polypropylene wax;
   from 0.01 to 5% by weight of at least one ester or amide of saturated or unsaturated aliphatic carboxylic acids having from 10 to 40 carbon atoms with saturated aliphatic alcohols or amines having from 2 to 40 carbon atoms; and
   D) from 0 to 80% by weight of other additives;
   wherein the total of the percentages by weight of components A) to D) is always 100%.

2. A thermoplastic molding composition as claimed in claim 1, where component B has a softening point to DIN EN 1427 (ring and ball method) of at least 140° C.

3. A thermoplastic molding composition as claimed in claim 1, where component B) has a viscosity to DIN 53018 of from 10 to 5000 mPas at 170° C.

4. A thermoplastic molding composition as claimed in claim 1, in which component B) has an average molecular weight (weight-average) $M_w$ of from 2000 to 60,000 (according to GPC using polystyrene standard).

5. A thermoplastic molding composition as claimed in claim 1, comprising;
   D1) from 0.005 to 2% by weight of a sterically hindered phenol;
   D2) from 0.001 to 2% by weight of a polyamide;
   D3) from 0.002 to 2% by weight of an alkaline earth metal silicate or of an alkaline earth metal glycerophosphate;
   or a mixture of these.

6. A thermoplastic molding composition as claimed in claim 1, comprising;
   D4) from 0.05 to 3% by weight of at least one compound of the formula

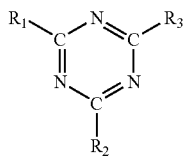

wherein $R_1$, $R_2$ and $R_3$ are identical or different and are, respectively, hydrogen atoms, halogen atoms, a hydroxy group, an alkyl group, an alkoxy group, an aryl group, an arylalkyleneoxy group, with the proviso that at least one of the radicals $R_1$, $R_2$ and $R_3$ is a substituted or unsubstituted amine group.

7. A thermoplastic molding composition as claimed in claim 1, comprising:
   D5) from 0.01 to 3% by weight of a nucleating agent selected from the group consisting of branched polyoxymethylenes, talc, and a mixture of these.

8. A thermoplastic molding composition as claimed in claim 1, in which component D4) is composed of a compound of the formula;

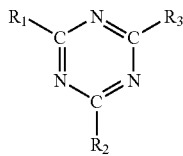

wherein $R_1$, $R_2$ and $R_3$ are identical or different and are, respectively, hydrogen atoms, halogen atoms, a hydroxy group, an alkyl group, an alkoxy group, an aryl group, an arylalkyloxy group, or a substituted or unsubstituted amine group, with the proviso that at least one of the radicals $R_1$, $R_2$ and $R_3$ is a substituted or unsubstituted amine group, and at least 1 radical $R_1$, $R_2$, or $R_3$ derives from an aromatic $C_5$-$C_{20}$ group, which may be unsubstituted or substituted.

9. The use of the thermoplastic molding compositions as claimed in claim 1 for producing fibers, films, or moldings.

10. A molding, produced from the thermoplastic molding compositions as claimed in claim 1.

11. A thermoplastic molding composition as claimed in claim 2, where component B) has a viscosity to DIN 53018 of from 10 to 5000 mPas at 170° C.

12. A thermoplastic molding composition as claimed in claim 2, in which component B) has an average molecular weight (weight-average) $M_w$ of from 2000 to 60,000 (according to GPC using polystyrene standard).

13. A thermoplastic molding composition as claimed in claim 3, in which component B) has an average molecular weight (weight-average) $M_w$ of from 2000 to 60,000 (according to GPC using polystyrene standard).

14. A thermoplastic molding composition as claimed in claim 2, comprising:
   D1) from 0.005 to 2% by weight of a sterically hindered phenol;
   D2) from 0.001 to 2% by weight of a polyamide;
   D3) from 0.002 to 2% by weight of an alkaline earth metal silicate or of an alkaline earth metal glycerophosphate;
   or a mixture of these.

15. A thermoplastic molding composition as claimed in claim 3, comprising:
   D1) from 0.005 to 2% by weight of a sterically hindered phenol;
   D2) from 0.001 to 2% by weight of a polyamide;
   D3) from 0.002 to 2% by weight of an alkaline earth metal silicate or of an alkaline earth metal glycerophosphate;
   or a mixture of these.

16. A thermoplastic molding composition as claimed in claim 4, comprising:
   D1) from 0.005 to 2% by weight of a sterically hindered phenol;
   D2) from 0.001 to 2% by weight of a polyamide;
   D3) from 0.002 to 2% by weight of an alkaline earth metal silicate or of an alkaline earth metal glycerophosphate;
   or a mixture of these.

17. A thermoplastic molding composition as claimed in claim 2, comprising:
   D4) from 0.05 to 3% by weight of at least one compound of the formula

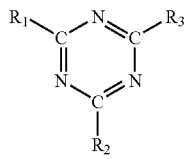

wherein $R_1$, $R_2$ and $R_3$ are identical or different and are, respectively, hydrogen atoms, halogen atoms, a hydroxy group, an alkyl group, an alkoxy group, an aryl group, an arylalkyleneoxy group, with the proviso that at least one of the radicals $R_1$, $R_2$ and $R_3$ is a substituted or unsubstituted amine group.

18. A thermoplastic molding composition as claimed in claim 3, comprising D4) from 0.05 to 3% by weight of at least one compound of the formula:

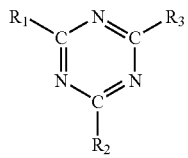

wherein $R_1$, $R_2$ and $R_3$ are identical or different and are, respectively, hydrogen atoms, halogen atoms, a hydroxy group, an alkyl group, an alkoxy group, an aryl group, an arylalkyleneoxy group, with the proviso that at least one of the radicals $R_1$, $R_2$ and $R_3$ is a substituted or unsubstituted amine group.

19. A thermoplastic molding composition as claimed in claim 4, comprising:

D4) from 0.05 to 3% by weight of at least one compound of the formula

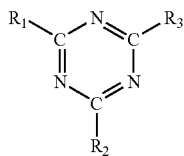

wherein $R_1$, $R_2$ and $R_3$ are identical or different and are, respectively, hydrogen atoms, halogen atoms, a hydroxy group, an alkyl group, an alkoxy group, an aryl group, an arylalkyleneoxy group, with the proviso that at least one of the radicals $R_1$, $R_2$ and $R_3$ is a substituted or unsubstituted amine group.

20. A thermoplastic molding composition as claimed in claim 5, comprising

D4) from 0.05 to 3% by weight of at least one compound of the formula:

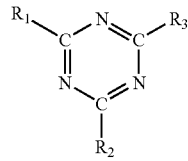

wherein $R_1$, $R_2$ and $R_3$ are identical or different and are, respectively, hydrogen atoms, halogen atoms, a hydroxy group, an alkyl group, an alkoxy group, an aryl group, an arylalkyleneoxy group, with the proviso that at least one of the radicals $R_1$, $R_2$ and $R_3$ is a substituted or unsubstituted amine group.

* * * * *